July 24, 1951     H. T. HUGHES     2,561,473
SHEET METAL NUT
Filed Aug. 16, 1946

INVENTOR.
HUGH T. HUGHES
BY John Mahoney
ATTORNEY

Patented July 24, 1951

2,561,473

UNITED STATES PATENT OFFICE 2,561,473

SHEET METAL NUT

Hugh T. Hughes, Cleveland, Ohio, assignor of fifty per cent to Margaret Janitelli, Cleveland, Ohio Application August 16, 1946, Serial No. 690,844

6 Claims. (Cl. 85—36)

My invention relates to spring fasteners of the type that may be quickly assembled upon a bolt, screw, stud, or the like, for clamping a plurality of members together.

Spring nut fasteners which can be positioned on a bolt or screw by the longitudinal movement of the bolt or screw through the fastener are well known in the art and are utilized in numerous installations in place of threaded nuts for quickly securing the parts of an assembly together. Such spring fasteners are usually formed by striking up from a spring metal body two opposed tongues, the end portions of which are then bent to conform to the pitch of the thread of the bolt which they engage. When only two tongues are utilized as in usual practice, only a portion of the thread of a bolt or screw is engaged and consequently stripping of the threads is liable to occur. To overcome this deficiency, it has been proposed to provide stub tongues between the two main tongues but when such fasteners are utilized with threaded bolts, or screws, the arcuate-shaped portions of the tongue still do not engage the shank of the bolt or screw over substantially its entire circumference and it is also necessary to incline the end of each stub tongue to conform to the pitch of the threaded portion of a bolt or screw which further increases the cost of the fastener.

It is the aim of the present invention to provide an improved fastener which is preferably formed of spring steel or spring bronze in which one or more of the tongues are struck up from the body of the fastener in such a manner that they will conform to the threads of a bolt or screw when the bolt or screw is threaded longitudinally through the fastener and one or more of the tongues are formed in such a manner that they are flexible enough to be easily bent to conform to the pitch of the threads when the bolt or screw is threaded in place. In the preferred form of my invention, four similarly-shaped tongues are provided, each of which terminates in an arcuate-shaped free end portion and as a consequence the ends of the tongues cooperate to engage a stud or the threads of a bolt or screw over substantially its entire circumference.

It is therefore an object of my invention to provide an improved fastener in which a plurality of tongues, each provided with an arcuate-shaped end, are struck up from the body of the fastener in such a manner that the ends of at least one or more of the tongues will automatically conform to the threads of a stud or bolt inserted through the fastener and which serve in conjunction with the fastener to secure a plurality of members together.

Another object of my invention is to provide an improved fastener in which a plurality of tongues are struck up from a fastener in such a manner that their free ends engage substantially the entire circumference of a stud or the threaded portion of a bolt or screw inserted through the fastener and which serves in conjunction with the fastener to clamp a plurality of members together.

A further object of my invention is to provide an improved fastener having a plurality of tongues struck up therefrom, one of which serves as a brace and the other two of which are bent upwardly from the body portion of the fastener and formed in such a manner that they will engage the shank of a bolt or stud inserted through a plurality of members and which tongues serve in conjunction with the bolt or stud to clamp the members together.

A still further object of my invention is to provide an improved fastener having four similarly shaped tongues struck upwardly therefrom, each of which has a free arcuate-shaped end, and at least two of which are bent up from the body portion in such a manner that their free end portions will conform to a portion of the stud or the threaded portion of a bolt or screw extending through the fastener and which cooperates with the fastener in clamping a plurality of members together.

My invention will be better understood by reference to the accompanying drawings in which.

Figure 1:
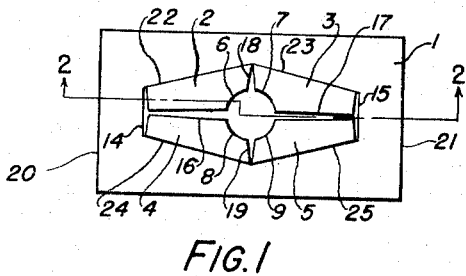
Fig. 1 is a plan view of my improved fastener.
Figure 2:
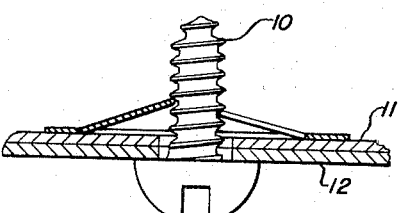
Fig. 2 is a cross sectional view of the fastener on the line 2—2 of Fig. 1, showing the fastener in assembly with a screw for clamping a pair of plates together.

While my improved fastener may be of any suitable shape and may be utilized to engage studs or the shanks of rivets, as illustrated in Figs. 1 and 2 of the drawings, a substantially rectangularly-shaped body 1 is shown having four similarly-shaped tongues 2, 3, 4 and 5 struck upwardly therefrom, each of which is provided with an arcuate-shaped free end portion 6, 7, 8 and 9, respectively, which engage the threads of a bolt or screw 10 that is utilized in conjunction with the fastener to clamp together a plurality of members 11 and 12.

As illustrated in Fig. 1, tongues 2, 3, 4 and 5, and the arcuate-shaped stud or thread-engaging portions 6, 7, 8 and 9 are preferably formed in a single stamping operation. In forming the tongues, a pair of slits 14 and 15 of the same length are cut in the body portion from which extend a pair of longitudinally extending slits 16 and 17 arranged perpendicular to slits 14 and 15, respectively, at their midpoints, and a pair of slits 18 and 19 which extend transversely to slits 16 and 17 midway between slits 14 and 15. As shown, slits 14 and 15 are parallel to and arranged a short distance from the ends 20 and 21 of the body portion and the combined length of slits 18 and 19, together with the opening formed by the arcuate-shaped portions 6, 7, 8 and 9 of the tongues, is substantially greater than slits 14 and 15.

By forming slits in the body portion in the manner specified, it is apparent that tongue 2 may be bent upwardly from the body portion on a diagonal line 22 extending between one end of slit 14 and the end of slit 18, tongue 3 may be bent upwardly on a diagonal line 23 extending between end slit 18 and one end of the slit 15, tongue 4 may be bent upwardly on a diagonal line 24 extending between the opposite end of slit 14 and one end of slit 19, and tongue 5 may be bent upwardly on a diagonal line 25 extending between the end of slit 19 and the opposite end of slit 15. When the tongues are bent upwardly along the line specified, it will be noted that slits 16, 17, 18 and 19 assume the form of narrow V-shaped slots.

When tongues 2, 3, 4 and 5 are bent upwardly on the diagonal lines 22, 23, 24 and 25 in the manner specified, it is apparent that the arcuate-shaped portions 6 and 9 of tongues 2 and 5 will naturally conform to the pitch of a thread or bolt extending through the fastener and in view of the fact that parallel slits or slots 18 and 15 are arranged at the opposite ends of tongue 3 and parallel slits or slots 14 and 19 are arranged at the opposite ends of tongue 4, tongues 3 and 4 will be comparatively flexible and consequently the edge of tongue 3 adjacent slot 17 may be easily inclined downwardly and the edge of tongue 3 adjacent slot 18 may be easily bent upwardly to cause the arcuate-shaped portion 7 of tongue 4 adjacent slot 18 to engage the thread of the bolt and in a like manner that part of the arcuate-shaped portion 8 of tongue 4 adjacent slot 16 may be easily bent downwardly and the part adjacent slot 19 may be easily bent upwardly to conform to the pitch of the threads and a fastener is therefore provided which will engage the threads of a screw or bolt over substantially its entire circumference.

When the fastener shown in Fig. 1 is positioned over a plurality of members, such as plates 11 and 12 as shown in Fig. 2 and the threaded portion of a screw or bolt is passed through aligned apertures in the plates and in the opening between tongues 2, 3, 4 and 5 and the bolt or screw is turned, tongues 2, 3, 4 and 5 are drawn toward each other which tends to close the narrow V-shaped slots 16 and 17 and the narrow V-shaped slots 18 and 19 and consequently the arcuate-shaped portions of the tongues are forced against the shank of the bolt or screw at the innermost portions of the threads.

Figure 3:
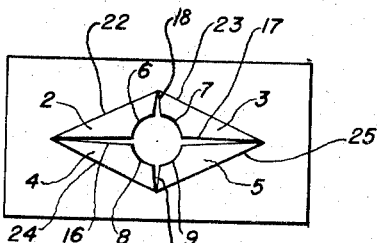
Fig. 3 is a plan view of a modification of the fastener shown in Figs. 1 and 2.

The modification shown in Fig. 3 is similar to that shown in Figs. 1 and 2 with the exception that slits 14 and 15 have been omitted and consequently the parts have been designated by the same reference numerals. In this form of fastener, the tongues are not as flexible as in the form shown in Figs. 1 and 2 and are therefore preferably utilized with studs or with threaded bolts or screws having a smaller pitch than that shown in Fig. 2 so that the amount of bending of the free arcuate-shaped portions 7 and 8 of tongues 3 and 4 to conform to the pitch of the threads will be comparatively small.

Figures 4, 5:
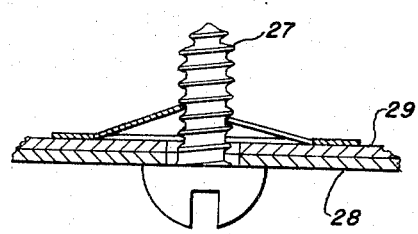
Fig. 4 is a plan view of another modification of my improved fastener.
Fig. 5 is a cross sectional view of the fastener shown in Fig. 4, showing the fastener in assembly with a screw for clamping a pair of plates together.
Figure 6:
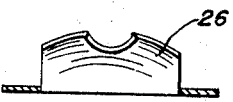
Fig. 6 is a cross sectional view on the line 6—6 of Fig. 4.

Another modification of my invention is shown in Figs. 4 to 6 of the drawing. This modification is similar to that shown in Fig. 1 with the exception that a single tongue 26 is provided in place of tongues 2 and 4. Tongue 26 is preferably convex in shape to increase its strength. The other tongues of the fastener are similar to tongues 3 and 5 in Fig. 1 and have accordingly been designated by the same reference numerals. When the shank of a threaded bolt or screw 27 is inserted through aligned apertures in plates 28 and 29 as shown in Fig. 5 and through the fastener, tongue 26 serves as a brace and when the arcuate-shaped free end of tongue 5 is bent upwardly on the diagonal line 25, it will naturally conform to the pitch of the thread of a bolt or screw and since tongue 3 is comparatively flexible because of slots 15 and 18, the arcuate-shaped portion 7 may be readily bent to conform to the pitch of the screw. As the screw 27 is threaded through the fastener, it will also be apparent that the V-shaped slot will be substantially closed and the arcuate-shaped portions 7 and 9 of tongues 3 and 5 will be forced firmly against the screw or bolt between two adjacent threads.

Figure 7:
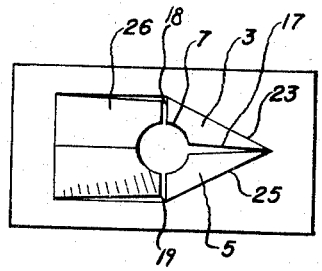
Fig. 7 is a modified form of the fastener shown in Figs. 4 to 6, inclusive.

The construction shown in Fig. 7 is similar to that shown in Fig. 4 with the exception that the slit 15 has been omitted. This form of fastener is preferably utilized with threaded bolts or screws having a smaller pitch than that shown in Fig. 2 in which not much inclination of the arcuate-shaped portion 7 is required to cause it to conform to the pitch of the threads.

In the modifications shown in Figs. 1 and 3, it will be apparent that tongues 2 and 5 when bent upwardly on the diagonal lines 22 and 25 will naturally conform to the pitch of the threads of a bolt or screw inserted through the fastener, and after tongues 3 and 4 are struck upwardly, their free ends may be bent in such a manner that the arcuate-shaped portions 7 and 8 will be inclined upwardly from slit 17 and slit 16, respectively, to conform to the pitch of the threads. In a like manner, in the modifications shown in Figs. 4 and 7, the free end of tongue 3 may be bent upwardly from slit 17 to conform to the pitch of the threads.

What I claim is:

1. A fastener for engaging and securing a rod-like threaded device comprising a flexible body formed of sheet metal or the like, said body having a first transverse slot arranged adjacent one end, a central circular opening, and a pair of aligned transverse slots extending substantially parallel to the end slot and arranged substantially centrally of the body, each of which transverse slots terminate at said central opening and the combined length of said centrally disposed slots, including the distance across the central opening between the slots, being greater than the first transverse slot, and said body having a longitudinal slot extending inwardly from the midpoint of the first transverse slot to the central opening which longitudinal slot is substantially perpendicular to the transverse slots to provide in conjunction with the central opening and the transverse slots a pair of tongues, each having an arcuate-shaped free end portion for engagement with said rod-like device, and said body portion also being provided with a bend line for one of said tongues extending diagonally outwardly from one end of the first transverse slot to the outer end of one of the centrally disposed slots and a second bend line for the other tongue extending diagonally outwardly from the other end of the first transverse slot to the outer end of the other centrally disposed slot and each of said tongues being struck upwardly along its respective bend line and one of said bend lines being so disposed that the free end portion of the tongue struck upwardly therefrom will automatically correspond to the pitch of the threads of the rod-like device and the other tongue being sufficiently flexible so that it may be easily bent to conform to the pitch of the threads of the rod-like device, and said body portion being provided with a third tongue struck upwardly therefrom having an arcuate-shaped free end portion bordering the central opening which third tongue extends toward the free end portions of the other tongues for engagement with another portion of said rod-like device.

2. A fastener for engaging and securing a rod-like threaded device comprising a flexible body formed of sheet metal or the like, said body having a first transverse slot arranged adjacent one end, a second transverse slot arranged adjacent the other end, a central circular opening, a pair of centrally disposed aligned transverse slots arranged substantially parallel to the end slots, each of which transverse slots terminates at the central opening and the combined length of the centrally disposed slots, including the distance across said opening between the centrally disposed transverse slots being greater than either of the transverse end slots, and a pair of longitudinal slots arranged substantially perpendicular to the transverse slots, one of which longitudinal slots extends inwardly from the midpoint of the first transverse end slot to the central opening and the other of which extends inwardly from the midpoint of the second transverse end slot to the central opening and said slots providing in conjunction with said central opening two pairs of tongues, each of which tongues has an arcuate-shaped free end portion for engaging the rod-like device, and said body having a pair of bend lines for one pair of tongues extending diagonally inwardly from the outer end of one of the centrally disposed transverse slots, one of which bend lines terminates at one end of the first transverse slot and the other of which terminates at one end of the second transverse slot, and a second pair of bend lines for the other pair of tongues extending diagonally inwardly from the outer end of the other centrally disposed slot, one of which bend lines terminates at the other end of the first transverse slot and the other of which terminates at the other end of the second transverse slot, and each of said tongues being bent upwardly from said body portion along its respective bend line, and two of said bend lines being so disposed that the free arcuate-shaped end portions of the tongues struck upwardly therefrom will automatically conform to the pitch of the threads of the rod-like device and the other two tongues being sufficiently flexible so that they may be easily bent to cause their free arcuate-shaped end portions to conform to the pitch of the threads of said rod-like device.

3. A fastener for engaging a rod-like threaded device as defined in claim 1 in which the free end portion of the third tongue is of sufficient size to engage the rod-like device over substantially half of its circumference.

4. A fastener for engaging a rod-like threaded device as defined in claim 1 in which the body portion has a third bend line extending transversely of the body adjacent that end of the body which is remote from the first transverse slot, and said third tongue being struck upwardly from the third bend line and having an arcuate-shaped free end portion bordering said opening which is of sufficient size to engage the rod-like device over substantially half of its circumference.

5. A fastener for engaging a threaded rod-like device as defined in claim 1 in which the body portion is provided with a third bend line extending transversely of said body portion which third bend line is arranged adjacent that end of the body portion which is remote from the first transverse slot and in which the third tongue is struck upwardly from said third bend line and said third tongue being convex in shape to increase its strength and having an arcuate-shaped portion at its free end which is of sufficient size to engage the rod-like device over substantially half of its circumference.

6. A fastener for engaging a threaded rod-like device as defined in claim 1 in which the body portion is also provided with a slot extending longitudinally from the outer end of one of the central transverse slots to a point remote from the end portion of the body which contains the first transverse slot and said body portion containing a second slot extending longitudinally from the outer end of the other central transverse slot to a point remote from the end portion of the body which contains the first transverse slot to provide in conjunction with the central opening a third tongue having a free arcuate-shaped end portion for engaging the rod-like device, and said third tongue being struck upwardly from said body portion on a bend line which is substantially parallel to the first transverse end slot.

HUGH T. HUGHES.

REFERENCES CITED

The following references are of record in the file of this patent:

UNITED STATES PATENTS

| Number | Name | Date |
| --- | --- | --- |
| Re. 22,544 | Tinnerman | Sept. 5, 1944 |
| 427,714 | Thompson | May 13, 1890 |
| 1,920,792 | Hotchkin | Aug. 1, 1933 |
| 2,266,049 | Kost | Dec. 16, 1941 |
| 2,369,595 | Miles et al. | Feb. 13, 1945 |
| 2,401,672 | Tinnerman | June 4, 1946 |